United States Patent [19]
Bezubic

[11] Patent Number: 4,995,213
[45] Date of Patent: Feb. 26, 1991

[54] FIBERGLASS REINFORCED PLASTIC WINDOW SASH FRAME AND ASSOCIATED METHOD

[75] Inventor: William P. Bezubic, Indiana, Pa.

[73] Assignee: Season-All Industries, Inc., Indiana, Pa.

[21] Appl. No.: 406,686

[22] Filed: Sep. 13, 1989

[51] Int. Cl.$^5$ ............................................. E04C 2/38
[52] U.S. Cl. ........................................ 52/656; 52/476; 403/401; 403/402; 403/403
[58] Field of Search .............................. 52/475–477, 52/656, 309.1, 401–403, 476, 656, 741; 403/401, 402; 40/152, 155; 160/390, 395

[56] References Cited

U.S. PATENT DOCUMENTS

| | | | |
|---|---|---|---|
| 871,130 | 11/1907 | Lunken et al. | 52/476 |
| 1,256,046 | 2/1918 | Schroyer | 52/476 |
| 3,087,207 | 4/1963 | Styra | 52/309.1 |
| 2,804,952 | 9/1967 | Nothdurft | 40/152 |
| 3,455,080 | 7/1969 | Meadows | 52/476 |
| 3,703,063 | 11/1972 | Budich et al. | 52/727 |
| 3,783,543 | 1/1974 | Hemgren | 52/656 |
| 4,370,830 | 2/1983 | Schaefer et al. | 49/504 |
| 4,428,156 | 1/1984 | Malm et al. | 49/501 |
| 4,624,091 | 11/1986 | Biro | 52/656 |
| 4,676,026 | 6/1987 | Schreiner | 49/501 |
| 4,689,933 | 9/1987 | Biro | 52/656 |
| 4,753,043 | 6/1988 | Bockwinkel | 49/59 |

FOREIGN PATENT DOCUMENTS

| | | | |
|---|---|---|---|
| 729085 | 4/1932 | France | 52/475 |
| 585887 | 11/1958 | Italy | 40/155 |

*Primary Examiner*—James L. Ridgill, Jr.
*Attorney, Agent, or Firm*—Arnold B. Silverman; David V. Radack

[57] ABSTRACT

A window sash frame which has fiberglass reinforced plastic framing members. The framing members have associated subframes. The subframes are joined at their ends so that the ends of the framing members are drawn towards each other to form a window sash frame having tight fitting corner joints. An associated method is also disclosed.

12 Claims, 2 Drawing Sheets

FIBERGLASS REINFORCED PLASTIC WINDOW SASH FRAME AND ASSOCIATED METHOD

BACKGROUND OF THE INVENTION

1. Field Of The Invention

This invention relates to fiberglass reinforced plastic ("FRP") window sash frames, and more particularly to window sash framing members which are formed by joining subframing members associated with the framing members.

2. Description Of The Related Art

Window sash frames made of synthetic resinous materials are known. These frames are composed of framing members, known as rails (horizontal members) and stiles (vertical members) formed by extrusions and composed of vinyl, for example. These types of window frames serve to provide the desired thermal insulation while establishing other desired performance characteristics such as elimination of the need for painting and resistance to chipping, scratching and other aesthetically unpleasant changes in the article. See U.S. Pat. Nos. 4,428,156, 4,676,026 and 4,689,933.

The separate framing members may be joined at a corner mitre joint. This corner mitre joint can be effected by welding, a screw connection, cementing or by using additional connecting members insertable in the frame. See U.S. Pat. Nos. 4,370,830 and 4,624,091.

It is known to provide these frames with aluminum reinforcing members. These reinforcing members stiffen the framing members and fill recesses created in the framing member profile See U.S. Pat. No. 4,624,091.

U.S. Pat. No. 4,753,043 discloses a glass door. The door consists of a structural frame having top and bottom tubular members and side tubular members. These members are coupled by corner keys which have a pair of perpendicularly disposed legs adapted for insertion into abutting ends of the members. The members are then secured to the corner key legs by rivets.

It is also known to have sashes made of hollow vinyl sash members which are mitred on each end. Aluminum reinforcement bars are inserted in the hollow area of the vinyl sash frame members. Typically, the top and bottom aluminum reinforcement bars are cut short of butting against the two side aluminum reinforcement bars. Screws are inserted through the vinyl sash frame members and aluminum bars of both ends of two of the four vinyl window sash framing members.

Despite the above products, there remains a need for a FRP window sash frame that has framing members which are tightly joined without the use of anchoring holes in the FRP framing members.

SUMMARY OF THE INVENTION

The window sash frame of the invention meets the above-captioned need. The window sash frame has a plurality of FRP framing members. The framing members have associated subframing members which may be mounted in channels defined by each framing member. The subframes are joined at their ends so that the ends of the framing members are drawn towards each other to form a window sash frame having tight fitting corner joints.

It is an object of the invention to provide a FRP window sash frame having tight fitting corner joints.

It is a further object of the invention to form the window sash frame by joining an aluminum subframe.

It is a further object of the invention to join the window sash frame without creating screw holes in or using adhesives on the FRP framing members.

It is a further object of the invention to provide an aluminum subframe on which window hardware, such as latches and locks, can be mounted.

It is a further object of the invention to have framing members having good contact with no open mitre problems It is a further object of the invention to provide a FRP window sash frame that is less susceptible to cracks and water leakage.

It is a further object of the invention to provide a FRP framing member in which the fibers can be oriented to allow for greater strength.

These and other objects of the invention will be more fully understood from the following description of the invention with reference to the drawings appended to this Application.

DESCRIPTION OF THE PREFERRED EMBODIMENTS

Figure 1:
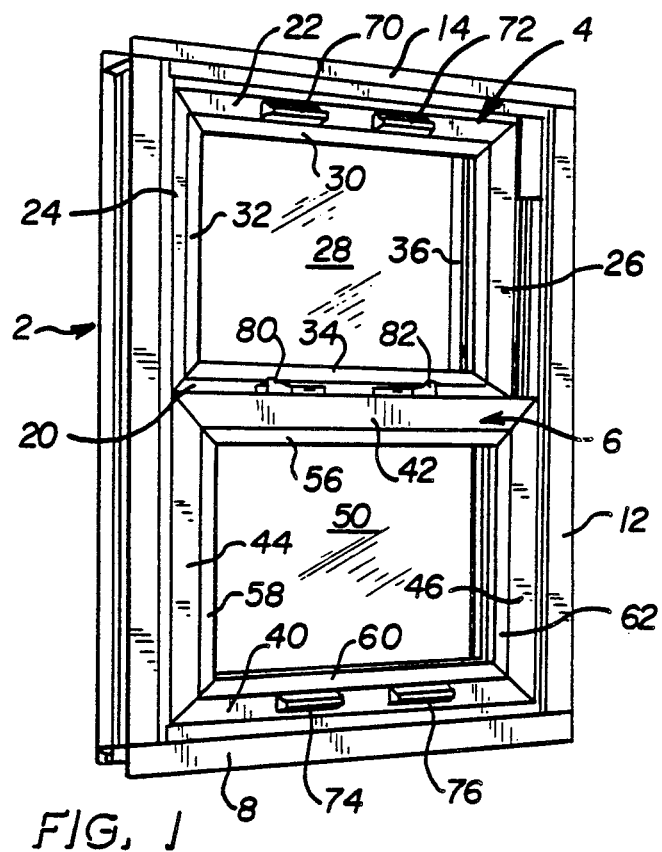
FIG. 1 is a perspective view of a form of double hung window employing the FRP window sash framing members of the present invention.

Referring more specifically to FIG. 1, there is shown a window 2 which, in the form shown, is a double hung window having an upper sash 4 and a lower sash 6. As the window sill 8, jambs 10, 12 and head 14 do not form part of the invention per se, they may take any form which is structurally compatible with the window sash member of the present invention.

The upper sash 4 has a bottom rail 20, a top rail 22 and vertical members of stiles 24, 26. A glass pane 28 is retained in place by glazing strips 30, 32, 34, 36. Similarly, bottom sash 6 has a bottom rail 40, a top rail 42 and vertical members or stiles 44, 46. Glass pane 50 is retained in position by glazing strips 56, 58, 60, 62. Handles 70, 72 are secured to the upper rail 22 of upper sash 4 and handles 74, 76 are secured to lower rail 40 of the bottom sash 6. Rotating latch members 80, 82 are secured to upper rail 42 and cooperate with associated keepers (not shown) in lower rail 20 of upper sash 4 to provide a locked position wherein relative movement between the sash members 4, 6 is prohibited.

The rails 20, 22 and 40, 42 and stiles 24, 26 and 44, 46 of the sashes 4, 6 are made of fiberglass reinforced plastic ("FRP") by a "pultrusion" process. Pultrusion is a continuous molding process utilizing glass or fibrous reinforcement in a polyester or other thermosetting resin matrices. Pre-selected reinforcement materials like fiberglass roving, mat, or cloth are drawn through a resin bath where all the material is thoroughly impregnated with a liquid thermosetting resin. The wet-out fibrous laminate is formed to the desired geometric shape and pulled into the heated steel die. Once in the die, the resin cure is initiated by controlling precise elevated temperatures. The laminate solidifies in the exact shape of the cavity of the die as it is being continuously pulled by the pultrusion machine.

The FRP window sash members are more lightweight than aluminum and are substantially more stable dimensionally than vinyl. This allows for a more tight fitting corner joint. FRP window sash frame members are also stronger structurally and can be used in caustic environments. The reinforcement materials in FRP can be changed as well as the resin matrices to make adjustments in performance of the material relatively easy.

Figure 2:
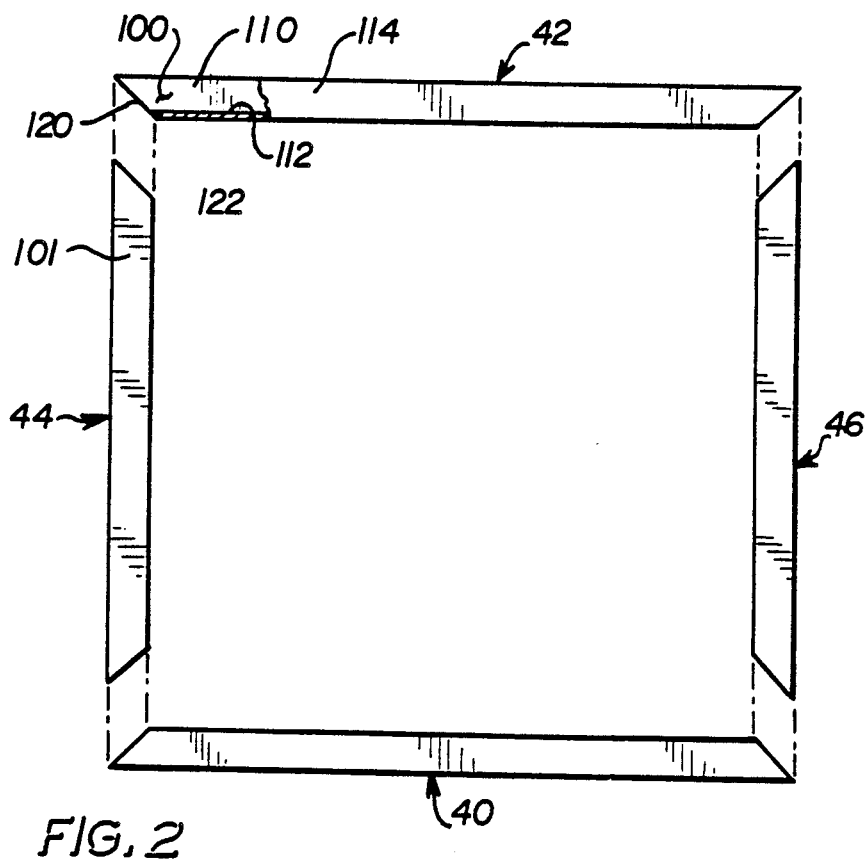
FIG. 2 is an exploded, partially fragmentary perspective view of the various framing members of the bottom sash of the double hung window shown in FIG. 1.

FIG. 2 shows rails 40, 42 and stiles 44, 46 of the bottom sash 6 before they are joined to form the window sash frame. The stiles 44, 46 and rails 40, 42 each define an upwardly open channel, as can be seen in FIG. 2 by observing channel 100 in rail 42 and channel 101 stile 44. Channel 100 of rail 42, for example, is formed by providing an inside sidewall 110, a base 112 and an outside sidewall 114. This profile is formed by an extrusion process well known to those skilled in the art. It will be appreciated that the other stile and rail members have a similar profile and that any desired shape, size or form of channel may be used to accomplish the objects of the invention.

The rails 40, 42 and stiles 44, 46 preferably have mitred corners to effect a meeting point for an adjacent rail to an adjacent stile. For example, rail 42 has a mitred corner at 120 which is complementary to the mitred corner 122 of stile 44. There are similar complementary mitred corners on each end of each stile 44, 46 and rail 40, 42 as can be seen in FIG. 2.

Figure 3:
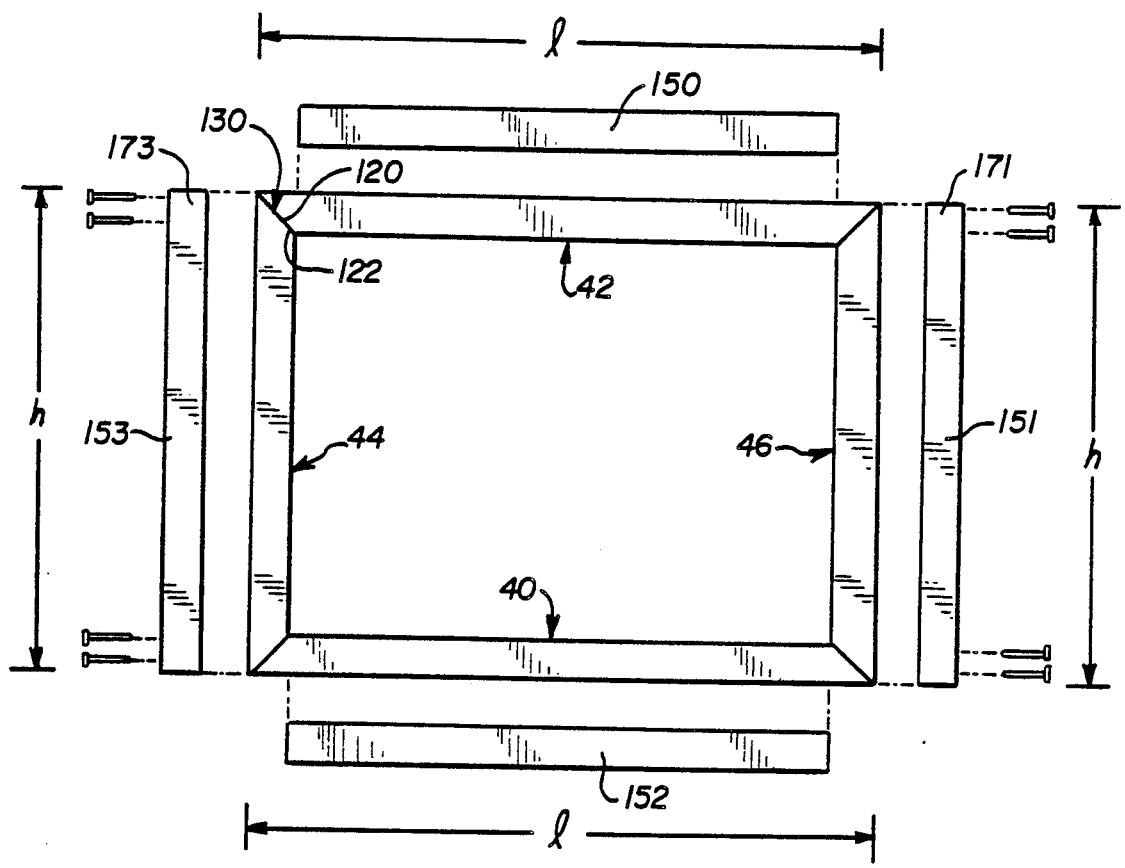
FIG. 3 is an exploded perspective view of the bottom sash showing the placing of the aluminum subframe.

Referring now to FIG. 3, the joining of the rails 40, 42 and stiles 44, 46 to form the window sash frame will be discussed. The rails 40, 42 and stiles 44, 46 are first positioned so that the mitred corners of each rail 40, 42 and stile 44, 46 are in contact with the adjacent mitred corner of rail 40, 42 or stile 44, 46 as for example rail 42 mitred corner 120 is in contact with stile 44 mitred corner 122 to form corner joint 130.

Once this is accomplished four aluminum subframes 150, 151, 152, and 153 are positioned into the channels of the respective rail and stile members, such as for example subframe 150 in channel 100. Other materials such as steel and wood can be used, however, aluminum is preferred because of its wide spread availability and cost.

Figure 4:
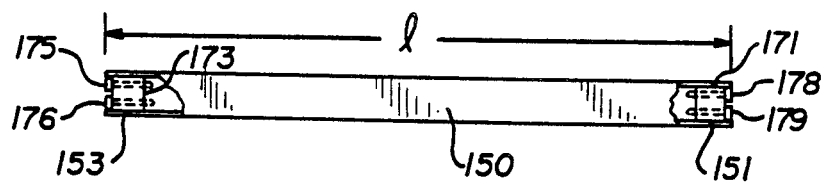
FIG. 4 is a top plan view, partially in section, of the top rail showing the joining of the aluminum subframe members.

It will be noted that aluminum subframes 150, 152 are cut shorter than the longitudinal extent ("1") of the rails 40, 42, whereas, aluminum subframes 151 and 153 are cut approximately equal to the vertical extent ("h") of stiles 44, 46. For example, referring to FIG. 4, subframe member 150 is positioned in the channel 100 of rail 42 so that subframes 151 and 153 can be joined thereto. That is, vertical ends 171 and 173 of subframes 151 and 153 are dimensioned so that subframes 151 and 153 can be attached thereto as by screws 175, 176 and 178, 179 for example. It will be appreciated that subframe 152 is attached to subframes 151 and 153 in the same manner.

Joining of the aluminum subframes to each other will cause the mitred corners of the rails 40, 42 and stiles 44, 46 to be drawn in tight fitting engagement. This process puts all the corner joints in tension thus assuring good contact between the mitred corners and substantially eliminating open mitre corner problems. Because of the tight engagement, the window sash frame will be less susceptible to water and air leaks, thus providing better insulation to the building in which it is mounted. Because the subframing members are not anchored to the framing members, there are no holes in or welding of the rails and stiles. This substantially reduces stress and crack migrations associated with conventional joining methods and permits better orientation of FRP fibers in the framing members making for stronger window frames.

The subframing members also allow the anchoring of window hardware, such as latches 80 and 82 shown in FIG. 1, directly thereon, thus reducing the stress on the top rail. The hardware is better anchored on the stiffer aluminum subframe than on the FRP framing members.

The method of the invention comprises providing a plurality of FRP framing members each having a pair of ends and each defining a channel, placing an aluminum subframing member having a pair of ends in the channel and joining each end of the subframing member to an adjacent end of another subframing member. The method provides that the ends of the framing members will be drawn towards each other to form a window sash frame having tight fitting corner joints.

It will be appreciated that a FRP window sash frame is provided that has tightly fitted mitred corners without the need for screws or other adhesives being applied directly to the FRP framing members. The FRP window sash frame not only provides desired thermal insulation but also eliminates the need for painting and resists chipping, scratching and other visually aesthetic unpleasant changes which may occur to conventional window sash frame.

Whereas a particular embodiment of the invention has been described above for purposes of illustration, it would be evident to those skilled in the art that numerous variations of the details may be made without departing from the invention as defined in the appended claims.

I claim:
1. A window sash frame, comprising:
   a plurality of framing members each made of fiberglass reinforced plastic and each having a pair of ends;
   said framing members each defining a channel;
   a plurality of subframing members, each said subframing member being received in said channel; and
   mechanical fastener means securing a first subframing member to an adjacent second subframing member to create a substantially rigid subframe for said window sash frame, whereby said ends of said framing members are drawn towards each other to form said window sash frame having tight fitting corner joints and whereby said subframe is secured to said window sash frame without requiring penetration of fasteners into said window sash frame.
2. The frame of claim 1, including
   a first, second, third and fourth framing member, said first framing member being substantially parallel to said third framing member and said second framing member being substantially parallel to said fourth framing member and
   a first, second, third and fourth subframing member associated with each said framing member.
3. The frame of claim 2, wherein
   said first subframing member is shorter in length than said first framing member and
   said third subframing member is shorter in length than said third framing member.
4. The frame of claim 3, wherein said ends of said framing members are mitred.

5. The frame of claim 4, wherein hardware means attached to said subframing members.

6. The frame of claim 5, wherein said subframing members are made of aluminum.

7. A method of forming a window sash frame, comprising:
  providing a plurality of fiberglass reinforced plastic window framing members each having a pair of ends and each defining a channel;
  placing a subframing member having a pair of ends in each said channel; and
  mechanically joining each of said subframing members to an adjacent subframing member to create a substantially rigid subframe for said window sash frame, whereby said ends of said framing members are drawn towards each other to form said window sash frame having tight fitting corner joints and whereby said subframe is secured to said window sash frame without requiring penetration of fasteners into said window sash frame.

8. The method of claim 7, wherein employing a first, second, third and fourth framing member having associated first, second, third and fourth subframing members;
  placing said first framing member parallel to said third framing member; and
  placing said second framing member parallel to said fourth framing member.

9. The method of claim 8, wherein
providing said first subframing member is shorter in length than said first framing member and
providing said third subframing member is shorter in length than said third framing member.

10. The method of claim 9, wherein
joining said subframing members with screws.

11. The method of claim 10, wherein
employing aluminum as the material for making said subframing members.

12. The method of claim 11, wherein
affixing hardware means to said aluminum subframe members.